Figure 1:
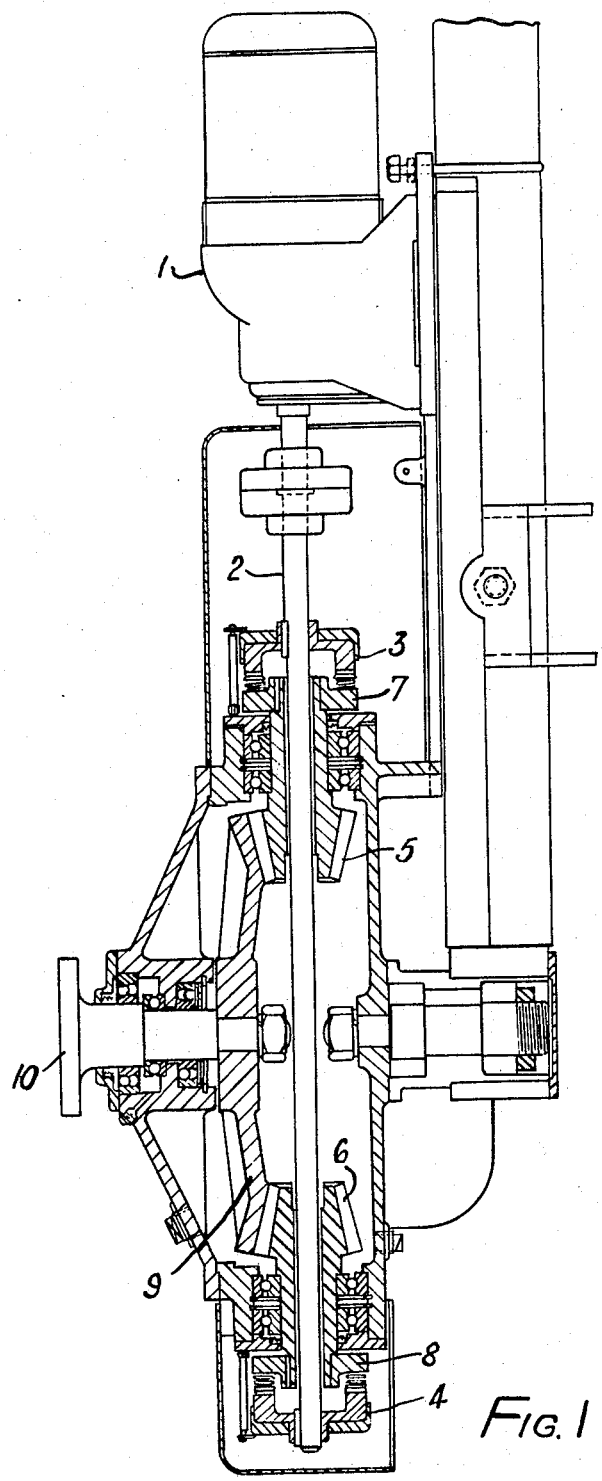

United States Patent Office 3,326,057
Patented June 20, 1967

3,326,057
GEAR BOX FOR TRANSMITTING SELECTIVELY REVERSIBLE AND OVERRIDABLE POWER FROM AN INPUT SHAFT TO AN OUTPUT SHAFT
Robert Kennedy, Clarkston, Scotland, assignor to Foundry Plant and Machinery Limited, Glasgow, Scotland, a company of Great Britain
Filed Mar. 19, 1964, Ser. No. 353,071
Claims priority, application Great Britain, Mar. 23, 1963, 11,627/63
2 Claims. (Cl. 74—378)

The subject of this invention is a gear box.

In operating a machine it is sometimes necessary in order to obtain sufficiently delicate control of the machine to move parts of the machine by hand yet such parts may be heavy making entirely manual operation difficult. It is an object of the present invention to provide a gear box contrived to provide power assistance for moving a machine part while leaving the direction and amount of movement of the part entirely under hand control.

An example of the type of apparatus to which such a gear box is applicable is a sandslinger where the head is movable to project sand into a moulding box. Although the head of a sandslinger is, in large machines at least, a heavy piece of apparatus it must be readily swingable in either direction by the operator at a speed determined by the operator.

A gear box according to the invention incorporates a power output shaft, a power input shaft connectible to a driving means and two gear trains each associated with a respective clutch device constructed to slip when the torque transmitted through the clutch device exceeds a predetermined magnitude, the input shaft and the output shaft being connectible with one another by one or other of the two gear trains in such wise that for a given direction of rotation of the input shaft the output shaft rotates in the one direction or the opposite direction according to the gear train brought into use by engagement of the associated clutch device.

In one construction the clutch devices are electromagnetic clutch devices.

In one construction of gear box a driven bevel pinion is attached to the power output shaft and two driving bevel pinions located diametrally opposite one another and in mesh with the driven bevel pinion are mounted freely on the power input shaft, each driving bevel pinion being connected to one element of the respective associated clutch device, the other elements of both clutch devices being connected to the power input shaft.

The clutch devices may be arranged to be controlled by switches and the switches may be operable by at least one spring-loaded handle which may be so connected to the clutch devices that when the handle is unoperated the associated clutch devices are disengaged. The handle with the associated switches may be mounted on the machine part to be moved so that to move the machine part in the desired direction the handle is used to push or pull the machine part.

Where a machine part is to be universally movable in one plane the machine part may be operatively connected to two separate gear boxes, one providing forward and rearward movement and the other providing sideward movement. The one handle may be contrived to control the switches of both gear boxes by arranging that the handle operates like a joy stick, forward and rearward movement of the handle operating the switches controlling operation of the gear box providing forward and rearward movement of the machine part and sideward movement of the handle operating the switches controlling operation of the gear box providing sideward movement of the machine part.

Figure 2:
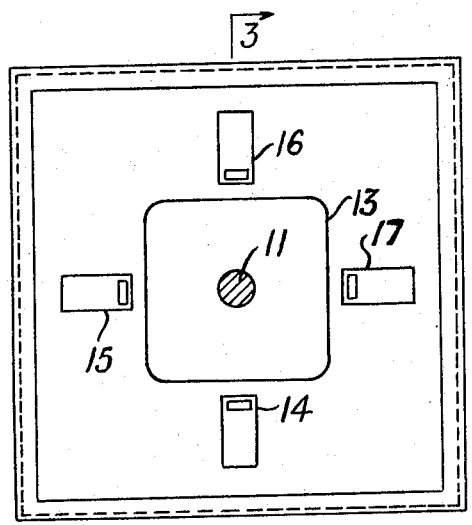
Figure 3:

A practical embodiment of the invention is illustrated in the accompanying drawings in which FIG. 1 is a longitudinal section through a gear box, FIG. 2 is a plan view of a control device for the gear box with its protective lid removed and FIG. 3 is a section through the line 3—3 in FIG. 2 showing the control device with the protective lid in place.

In the drawings, 1 denotes a driving motor in driving connection with a power input shaft 2 to which is fastened a clutch element 3 of one clutch device and a clutch element 4 of another clutch device. 5 and 6 denote bevel pinions freely rotatable about the shaft 2, the pinion 5 being connected to a clutch element 7 co-operative with the clutch element 3 and the pinion 6 being connected to a clutch element 8 co-operative with the clutch element 4. The pinions 5 and 6 are permanently in mesh with a driving bevel pinion 9 fastened to a power output shaft 10 coupled to the machine part to be moved. The clutch devices 3, 7 and 4, 8 are under the control of an operating handle 11 which is swingable about a ball support 12 and carries a member 13 engageable with switches 14, 15, 16 and 17 according to the position of the handle. The handle is spring-loaded to the neutral position shown in which all the switches are unactuated and the clutch devices are disengaged. The switches 14 and 16 control the clutch elements 3, 7 and 4, 8 respectively and the switches 15 and 17 are provided to control corresponding clutch elements in a second gear box (not illustrated) provided to move the machine part in a direction at right angles to the direction of movement provided by the gear box illustrated. The clutches 3, 7 and 4, 8 are set to slip when the torque transmitted from the shaft 2 to the pinion 5 or 6 exceeds a predetermined value. 18 denotes a flexible sealing member preventing ingress of moisture and dirt to the box 19 containing the switches 14, 15, 16 and 17.

In practice, the driving motor 1 is in operation all the time the machine is in use but the clutches 3, 7 and 4, 8 are normally disengaged when the machine is not in actual operation. When the machine part is to be moved in one direction the handle 11 is grasped and pushed or pulled to move the machine part in the desired direction. Movement of the handle 11 closes the appropriate switch 14 or 16 and causes the associated clutch device 3, 7 or 4, 8 to be energised and the clutch to be engaged so that power is transmitted from the driving motor 1 through the clutch device selected through the associated gear train 5, 9 or 6, 9 to the power output shaft 10 causing the power output shaft 10 to be rotated in the direction to move the machine part in the desired direction. The speed of movement of the machine part is controlled by the operator since if he moves the part faster than the rotational speed of the output shaft 10 provided by the driving motor 1 the respective clutch device 3, 7 or 4, 8 in operation is caused to slip but the effort provided by the driving motor 1 augments the effort supplied by the operator up to the limit of the torque which can be transmitted by the clutch device. If the operator moves the machine part at a speed lower than that provided by the output shaft 10 the clutch device in operation again slips, the driving means overrunning the clutch device. The direction of movement of the machine part is reversed by moving the handle 12 in the other direction. The effect of this is to de-energise the clutch device which was previously energised and to energise the other clutch device which was previously unenergised. The first gear train is thus disconnected and the second gear train providing movement of the output shaft 10 in the opposite direction is brought into use.

What is claimed is:

1. A gear box incorporating a power output shaft, a power input shaft connectible to a driving means, a driven bevel pinion attached to the power output shaft, two co-axial driving bevel pinions located diametrically opposite one another and in mesh with the driven bevel pinion, said driving pinions being freely rotatable about the power input shaft which passes co-axially of the driving bevel pinions through the driving bevel pinions and having less teeth than said driven bevel pinion, and two clutch devices one element of each of which is connected to a respective driving bevel pinion and the other element of each of which is connected to the power input shaft, each clutch device being arranged to slip when the torque transmitted through it exceeds a predetermined magnitude so as to permit said input shaft to overrun said output shaft, or vice versa.

2. A clutch device as claimed in claim 1 in which switches control operation of the clutch devices and a single handle controls operation of the switches.

References Cited

UNITED STATES PATENTS

| | | | |
|---|---|---|---|
| 710,788 | 10/1902 | Lyndon | 192—84 |
| 1,169,937 | 2/1916 | Dikeman | 74—378 X |
| 1,596,939 | 8/1926 | Mrongovius et al. | 74—378 X |
| 2,454,424 | 11/1948 | Baak | 74—378 X |
| 2,688,388 | 9/1954 | Gill | 192—215 X |
| 2,718,292 | 9/1955 | Meilander et al. | 74—378 X |
| 3,092,984 | 6/1963 | Kramer et al. | 192—84 |

FOREIGN PATENTS 1,132,230   10/1956   France.

DONLEY J. STOCKING, *Primary Examiner.*

DAVID J. WILLIAMOWSKY, *Examiner.*

L. H. GERIN, *Assistant Examiner.*